United States Patent
Rathke

(10) Patent No.: US 10,364,885 B2
(45) Date of Patent: Jul. 30, 2019

(54) LOAD-DEPENDENT REGULATION OF HYDRAULIC MOTORS

(71) Applicant: Danfoss Power Solutions GmbH & Co. OHG, Neumunster (DE)

(72) Inventor: Rolf Rathke, Hohn (DE)

(73) Assignee: Danfoss Power Solutions GmbH & Co. OHG, Neumunster (DE)

(*) Notice: Subject to any disclaimer, the term of this patent is extended or adjusted under 35 U.S.C. 154(b) by 640 days.

(21) Appl. No.: 15/098,872

(22) Filed: Apr. 14, 2016

(65) Prior Publication Data
US 2016/0341308 A1 Nov. 24, 2016

(30) Foreign Application Priority Data
May 21, 2015 (DE) .......................... 10 2015 209 356

(51) Int. Cl.
*F16H 61/44* (2006.01)
*F16H 61/421* (2010.01)
(Continued)

(52) U.S. Cl.
CPC .......... *F16H 61/421* (2013.01); *F15B 11/161* (2013.01); *F15B 13/06* (2013.01);
(Continued)

(58) Field of Classification Search
CPC . B60K 17/10; B60W 10/103; B60W 30/1884; B60W 2510/1005;
(Continued)

(56) References Cited

U.S. PATENT DOCUMENTS

| | | | | |
|---|---|---|---|---|
| 6,276,134 B1* | 8/2001 | Matsuyama | .......... | E02F 9/2253 |
| | | | | 475/73 |
| 6,857,986 B2* | 2/2005 | Ikari | .................... | F16H 61/423 |
| | | | | 477/64 |
| 2010/0050624 A1 | 3/2010 | Essig | | |

FOREIGN PATENT DOCUMENTS

| | | |
|---|---|---|
| CN | 103260984 A | 8/2013 |
| CN | 104295733 A | 1/2015 |

(Continued)

*Primary Examiner* — F Daniel Lopez
*Assistant Examiner* — Dustin T Nguyen
(74) *Attorney, Agent, or Firm* — McCormick, Paulding & Huber LLP

(57) ABSTRACT

Method for the load-dependent regulation of a hydrostatic drive (1), with a closed hydraulic fluid circuit comprising a first hydraulic motor (5) and, parallel to this, a second hydraulic motor (6), whereby both hydraulic motors (5 and 6) are capable of being powered by a hydraulic pump (3) via a high-pressure line (7) and a low-pressure line (8) and are mechanically coupled to each other via a transmission (70). The displacement of the first hydraulic motor (5) can be adjusted proportionally to an electrical signal of an electronic control system (50) by means of an electro-proportional control valve (10) and the displacement of the second hydraulic motor (6) can be adjusted by means of a pressure-proportional control valve (20) which is hydraulically connected to the high-pressure line (7) via a control pressure line (21). The pressure-proportional control valve can be activated by means of a control pressure which is dependent on the high pressure. By means of automatic opening of the pressure-proportional control valve (20) dependent on the high pressure, proportional to the exceedance of a predefinable pressure limit in the high-pressure line (7), the displacement of the second hydraulic motor (6) is adjusted by means of a second servo control unit which can be controlled via the pressure-proportional control valve (20). By means (Continued)

of the electronic control system (50), the actual volume flow passing through the first hydraulic motor (5) is determined and compared with a target value for the volume flow. Based on a deviation between the actual and target value for the volume flow, the electronic control system (50) calculates an adapted control signal and transmits this to the electro-proportional control valve (10), as a result of which the displacement of the first hydraulic motor (5) is adaptable by means of a first servo control unit (14), which is controlled via the electro-proportional control valve (10).

24 Claims, 2 Drawing Sheets

(51) Int. Cl.
| | | |
|---|---|---|
| *F16H 61/472* | (2010.01) | |
| *F15B 11/16* | (2006.01) | |
| *F15B 13/06* | (2006.01) | |
| *F16H 39/02* | (2006.01) | |
| *F16H 47/02* | (2006.01) | |

(52) U.S. Cl.
 CPC .............. *F16H 39/02* (2013.01); *F16H 61/44* (2013.01); *F16H 61/472* (2013.01); *F15B 2211/50* (2013.01); *F16H 47/02* (2013.01)

(58) Field of Classification Search
 CPC ........... B60W 2710/0644; E02F 9/2246; E02F 9/2253; F02D 29/02; F02D 29/04; F15B 11/161; F15B 13/06; F15B 2211/50; F15B 2211/76; F15B 2211/763; F16H 39/02; F16H 47/02; F16H 2047/025; F16H 61/421; F16H 61/439; F16H 61/44; F16H 61/444; F16H 61/452; F16H 61/456; F16H 61/472
 See application file for complete search history.

(56) References Cited

FOREIGN PATENT DOCUMENTS

| | | |
|---|---|---|
| CN | 104514874 A | 4/2015 |
| DE | 102007003800 B3 | 5/2008 |
| DE | 11 2006 002 950 T5 | 11/2008 |
| DE | 102009011247 A1 | 9/2010 |

\* cited by examiner

LOAD-DEPENDENT REGULATION OF HYDRAULIC MOTORS

CROSS REFERENCE TO RELATED APPLICATION

Applicant hereby claims foreign priority benefits under U.S.C. § 119 from German Patent Application No. DE102015209356.5 filed on May 21, 2015, the content of which is incorporated by reference herein.

TECHNICAL FIELD

The invention relates to a load-dependent regulation of hydraulic motors which are arranged parallel to each other in a closed hydraulic fluid circuit and whose hydraulic power is provided by a hydraulic pump, preferably variably adjustable in its delivery volume, which is in turn powered by a drive motor. The inventive concept relates to two-motor or multiple-motor drives for hydrostatic drivetrains, whereby at least one hydraulic motor is an electro-proportionally adjustable, flow-regulated hydraulic motor which is adjustable in its displacement and stroke volume proportionally to an electrical control signal by means of an electronic control system. The hydraulic motors arranged in the drivetrain can preferably be operated in both rotational directions and are variably adjustable in their stroke volume and displacement for both rotational directions.

BACKGROUND

In many applications, two-motor or multiple-motor drives are used for hydrostatic drives where a broad range of rotational speeds is required combined with large torque ranges, whereby the power available is limited. Such broad spectrums of rotational speed and torque, also referred to as conversion ranges, are also expected to be available in highly diverse operating situations with minimum control/regulation effort on a load-dependent basis and/or depending on the operating situation. For example, a high torque is required in hydrostatic motor vehicle drives for the purpose of acceleration from standing or for hill climbs, but this torque decreases as travel speed increases. In order to reach as high a travel speed as possible, high rotational speeds are required at the output shaft of a hydrostatic drive. Such high demands of the conversion or transmission range—on the one hand a high level of torque and on the other hand a high rotational speed—are often not possible to achieve in a satisfactory manner with a single hydraulic motor in the hydrostatic drive. What is more, the market calls for increasingly high maximum rotational speeds or travel speeds which extend the transmission range of a hydrostatic drive. In the state of the art, this is addressed by means of so-called multiple-motor drives, whereby for example two or more motors are provided to supply initially a high torque in order to accelerate from standing, and whereby the number of driving hydraulic motors is reduced as travel speed is increased, until for example often only one hydraulic motor remains in the drive until maximum speed is reached.

In this type of hydrostatic drive usually comprising two motors, the hydraulic motor for the provision of high torque, which is hydraulically connectable and disconnectable, is preferably selected as being larger in its maximum stroke volume than the hydraulic motor operating permanently in the drivetrain. The reason for this generally lies in the fact that a hydraulic motor with a small maximum displacement can reach a higher rotational speed but the level of maximum torque it can provide is lower, in accordance with the relatively small maximum displacement. Both radial piston motors and axial piston motors are used in this type of two-motor or multiple-motor drive.

SUMMARY

In the description of the invention, the example taken to explain the invention will be a hydrostatic motor vehicle drive with two hydraulic motors, though this merely serves to simplify the explanation of the inventive concept. The inventive concept includes all hydrostatic drives which are structured in principle as set out above, no matter whether these are used as motor vehicle drives, transport drive facilities or in other hydrostatic drives.

The hydraulic motors are powered by hydraulic pumps which are preferably adjustable in their delivery volume. These hydraulic pumps are in turn supplied with mechanical power by a drive motor which is often a combustion engine, preferably a diesel engine. However, the drive motor can also be an electric motor or any other kind of drive motor which ensures that the hydraulic pump can provide enough hydraulic power for the hydraulic motors. In current practice, diesel engines or electric motors are generally used as drive motors.

The (external) loads acting on a hydrostatic (multiple-motor) drive are normally not constant and change according to the operating situation, conditions of use and purpose of operation. The hydraulic motors used must therefore be adaptable in the rotational speed and torque they supply (secondary control). If for example the external load increases, the torque supplied by the hydrostatic drive has to be increased so that the hydrostatic drive does not come to a standstill. As the supply of torque increases, however—hydraulic power being limited—the rotational speed decreases, which means in the case of a motor vehicle drive that it becomes slower. In the state of the art, the hydraulic motors used are each actuated separately and individual controlled or set in their respective displacement levels according to the specific requirements of the situation so as to compensate for changes in the external load (secondary regulation). Both electro-proportionally and pressure-proportionally adjustable hydraulic motors are conventionally used.

In the case of multiple-motor drives, a particular challenge is posed to a person skilled in the art by the secondary regulation, i.e. the optimum setting of the displacement levels of the individual hydraulic motors as well as the hydraulic synchronization and the timely connectability and disconnectability of the individual hydraulic motors according to the given operating situation, especially in the case of load changes. Such challenges are conventionally addressed by the use of microcomputers and large number of sensors and signal lines and/or BUS systems. With an increasing number of electronic parts and components for the control, regulation and monitoring of hydrostatic drives, however, not only do the cost and complexity of such drives increase but also their vulnerability to faults, which necessarily diminishes the reliability and robustness of a hydrostatic drive and thereby impairs its economic efficiency.

The invention has therefore set itself the task of providing a simple method for the load-dependent regulation of the displacement levels of hydrostatic multiple-motor drives and in particular to reduce the number of elements required to control the motors such as sensors, electric lines etc. to a minimum. A further object of the invention is to provide a robust and reliable regulation of hydraulic motors which in particular ensures optimum control of the synchronization of the hydraulic motors used and adapts the number of hydraulic motors participating in powering the hydrostatic drive automatically according to the given operating situation, without overloading the drive motor of the hydrostatic drive. It is further an object of the invention to provide such a regulation in a low-cost manner, whereby already existing hydrostatic drives are likewise to be capable of being controlled by it.

Another object of the invention is to provide a regulation for hydrostatic multiple-motor drives which can be used in existing hydrostatic multiple-motor drives so as to be able to expand or retrofit these with a simple and robust regulating system at a low cost, in particular where only a limited number of electrical control signals are available. The method according to the invention and the device according to the invention should also allow existing single-motor drives to be retrofitted or expanded to multiple-motor drives without have to make substantial changes to the electronic control of the work machine.

The objects which the invention sets itself are achieved by means of the inventive method of load-dependent regulation for a hydrostatic drive according to claim 1, whereby dependent claims which depend directly or indirectly on claim 1 are oriented towards preferred embodiments. The objects which the invention sets itself are further achieved by means of a hydrostatic drive according to independent claim 9, whereby here again dependent claims which depend directly or indirectly on claim 9 are oriented towards preferred embodiments.

The inventive method of load-dependent regulation of a hydrostatic drive is applied to a hydrostatic drive with a closed hydraulic fluid circuit in which the hydraulic pump can power a first hydraulic motor via a high-pressure line and at least one other second hydraulic motor, arranged parallel to the first hydraulic motor. For the purpose of simplifying the description of the invention, the explanation of the main details of the invention will be limited to hydrostatic two-motor drives, though this does not limit the inventive concept to such two-motor drives. In reading the description of the invention, a person skilled in the relevant art will quickly discover that the method described here can also be used according to the invention for three-motor or multiple-motor drives.

In the state of the art, the displacement levels of the hydraulic motors in multiple-motor drives are normally set electro-proportionally. There are occasional solutions with electro-proportionally and pressure-proportionally adjustable hydraulic motors, but hydraulic motors in such hydraulic drives are normally controlled in their displacement separately, i.e. independently of one another. According to the invention, a dependent interaction between the two control types is introduced in a hydrostatic drive with at least two hydraulic motors. Further according to the invention, one of the (two) hydraulic motors must be electro-proportionally controllable and the second (or other) hydraulic motor(s) is (are) to be adjustable on a pressure-controlled basis.

Furthermore, the hydrostatic drives according to the invention must be such that the first, electro-proportionally adjustable hydraulic motor and the second, pressure-proportionally adjustable hydraulic motor arranged parallel to the first hydraulic motor are mechanically coupled to each other with their respective output shafts and with a shared output shaft of the hydrostatic drive, for example via a transmission. This means that the rotational speeds of the hydraulic motors are related to each other via the transmission ratio. If the rotational speed on the output shaft of one hydraulic motor is increased or reduced, the rotational speed on the output shaft of the other hydraulic motor and on the shared output shaft is likewise increased or reduced. Here, the inventive concept includes both fixed and alterable transmission ratios, for example as in the manner of a control gear or a planetary gear.

Based on an example embodiment of a hydrostatic drive according to the invention as a traction drive of a work machine, the load-sensitive or load-dependent interaction according to the invention of the two control types of the two hydraulic motors will be set out in the following. Further by way of an example, the hydrostatic drive in an initial situation selected by way of an example powers traction drive at a constant speed on a flat surface, whereby the pressure in the high-pressure line of the hydrostatic drive is lower than an opening pressure or pressure limit which would have the effect of activating the pressure-proportional adjustment device of the second hydraulic motor. In this operating situation, the drivetrain is powered solely by the first, electro-proportionally adjustable hydraulic motor. The second, pressure-proportional hydraulic motor does not participate in the drive since the pressure conditions in its servo displacement unit are configured in such a way that the second hydraulic motor exhibits a deflection angle at which its displacement is zero or minimal. driving mechanism of the second hydraulic motor is rotated jointly via the transmission which connects the two hydraulic motors.

It is generally true to say that an increase in the external load on a hydrostatic drive causes an increase in high pressure, for example if a vehicle fitted with a hydrostatic drive according to the invention changes from travelling on a flat surface as described above into a hill climb or the vehicle is to be accelerated. If one assumes the initial situation as described above in which only the electro-proportionally controllable hydraulic motor participates in powering a hydrostatic drive, and if one further assumes that the power provided by the drive motor of the hydraulic pump on the primary side is not to be or cannot be increased, it is necessary, if the external load acting on the shared output shaft of the hydrostatic drive rises, to increase the torque on the shared output shaft of the hydrostatic drive in order for the hydrostatic drive not to come to a standstill. This also means that at least one of the torque levels supplied by the hydraulic motors has to be increased. Often both, in order to satisfy the torque called for by the increased load. In order to increase the torque of a hydraulic motor, its displacement has to be increased. This can happen in two ways in the hydrostatic drive according to the invention: (i) electro-proportionally in the first hydraulic motor, if the increase in high pressure does not raise the high pressure in the high-pressure line above a pressure limit at which the pressure-proportional control of the second hydraulic motor is activated or (ii) pressure-proportionally in the second hydraulic motor and subsequently electro-proportionally in the first hydraulic motor if the high pressure in the high-pressure line does exceed this same pressure limit.

In the first alternative (i), the second hydraulic motor is not altered in its displacement and an electro-proportional adjustment of the displacement of the first hydraulic motor is applied as is familiar from the state of the art, for example as described in DE 10 2007 003 800 B3.

Generally speaking, the flow volume through the hydraulic motor is determined by the rotational speed and the deflection as commanded/set, i.e. the set displacement or stroke volume of the hydraulic motor. DE 10 2007 003 800 B3 describes a flow-regulated electro-proportional control of a hydraulic motor which, in a preferred embodiment of the invention, is used to control the first, electro-proportional hydraulic motor. In the control shown in DE 10 2007 003 800 B3, the flow volume through the first hydraulic motor is determined by monitoring the hydraulic motor rotational speed and the commanded displacement of the hydraulic motor and this is compared with a specified target value. Depending on the deviation from the specified target value, the displacement is electro-proportionally commanded to a new displacement by means of a change in control current so that the desired flow volume is arrived at given rotational speed. Also according to the invention, the flow volume generated by the first hydraulic motor is preferably controlled by such an electronic control system, whereby a control current is preferably relayed as a control signal to the standard electro-proportional adjustment device.

A separate control signal is standard to be required for each hydraulic motor for the purposes of electro-proportional control.

In order to produce the control signal, an electronic control system is conventionally used which determines control signals, for example in the form of a control current made up of signals, which are relayed to it from sensors for pressure, rotational speed and/or deflection angle. The electronic control system analyses the sensor signals and determines suitable control signals/control currents and sends/directs these to an electrically functioning actuator, for example, which acts electro-proportionally on a control valve. The actuator, for example a solenoid, in turn adjusts the control valve in such a way that an adjustment device, preferably a servo displacement unit, adapts the stroke volume/displacement of the hydraulic motor to the control signal determined by means of an adjustment element. Ultimately, the level of the control signal determines the electro-proportional adjustment of the displacement of the hydraulic motor. This type of electro-proportional adjustment of a hydraulic motor is well-known to the person skilled in the art and will therefore not be explained in further detail. These processes are familiar. The description of the present invention will therefore only explain in detail the procedures according to the invention for the second alternative in which the pressure in the high-pressure line exceeds a specified pressure limit.

In the hydrostatic drive according to the invention, as mentioned above, at least one electro-proportionally adjustable and one pressure-proportionally adjustable hydraulic motor are arranged parallel to each other and are mechanically connected at their output shafts via a transmission. If the pressure in the hydraulic fluid in the high-pressure line exceeds a specified pressure limit (alternative (ii)) because the external load increases or the hydrostatic drive is to be accelerated, the pressure-proportionally controlled hydraulic motor is deflected further so as to increase its torque output. This has consequences for the operating state of the first electro-proportionally controlled hydraulic motor, since the latter is both mechanically and hydraulically connected to the second, pressure-controlled hydraulic motor. At the same time as the torque increases at the output shaft of the second hydraulic motor, the rotational speed at the shared output shaft is reduced. Via the mechanical connection of the two output shafts, therefore, the rotational speed of the output shaft and of the drive mechanism of the first, electro-proportionally controlled hydraulic motor is reduced. As the rotational speed of the hydrostatic drive decreases and the flow volume at the second hydraulic motor increases, the actual value for the flow volume at the electro-proportionally controllable first hydraulic motor is likewise reduced, whereby it deviates from a specified target value for the flow volume. The electronic control system, which for example monitors the flow volume of the first hydraulic motor via the rotational speed and the commanded deflection angle, detects the deviation from the specified target value and increases the flow volume through the first hydraulic motor by commanding the deflection angle of the first hydraulic motor to be increased by means of a suitable control signal. As a result, the displacement at the first hydraulic motor increases until the latter once again exhibits the new (lower) rotational speed as specified by the target value.

According to the invention, therefore, the displacement adaptation of the first, electro-proportional hydraulic motor occurs as the result of a change in the displacement of the second, pressure-proportionally controlled hydraulic motor. Based on the decrease in flow volume at the first hydraulic motor, the electronic control system commands the first hydraulic motor to a higher displacement via the electro-proportional control valve in order to meet the specification for the flow volume once again, thereby counteracting the higher torque requirement at the output of the hydrostatic drive.

Further subsequently, the high pressure in the high-pressure line of the exemplarily selected hydrostatic drive drops again due to the increase of the displacement volumes of the two hydraulic motors. Due to the reduction of pressure in the high-pressure line, the control pressure on the second pressure-proportional control valve is also reduced, as a result of which the second hydraulic motor is reduced in its stroke volume or displacement by the associated servo displacement device. As the displacement of the second hydraulic motor decreases, however, its contribution to the torque on the hydrostatic drive also decreases. At the same time, the mechanical connection between the two output shafts of the hydraulic motors prevents the second hydraulic motor from increasing its rotational speed when it pivots back. After the decrease/lowering of the displacement of the second hydraulic motor, the pressure in the high-pressure line increases again, possibly once more reaching levels that are higher than the pressure limit. A pressure increase in the high-pressure line at a pressure level above the pressure limit once again leads to an increase in the displacement of the second hydraulic motor, whose deflection is (again) increased due to the increasing control pressure.

The repeated deflection/increase in displacement of the second hydraulic motor, according to the invention, as set out above, results in a subsequent increase in the displacement of the first hydraulic motor, insofar as the latter has not yet reached its maximum displacement. From this control loop, a person skilled in the art recognizes that the second pressure-controlled hydraulic motor supports the first hydraulic motor in supplying torque as the torque requirement increases on the hydrostatic drive in conjunction with compensating deflection angle increase and decrease. Here, the level of change in the deflection, i.e. the level of change in torque supplied by the second hydraulic motor, depends on the increase in torque required at the shared output shaft. The bigger the increase in torque required at the shared drive shaft, the more marked are the compensation movements of the adjustment element of the second hydraulic motor.

As long as the torque requirement at the first hydrostatic drive increases, the second hydraulic motor, after initially deflecting out of a zero position, will by dint of the operating conditions provide a high-pressure-dependent support torque or thrust torque for the first hydraulic motor, thereby forcing the first hydraulic motor to increase its deflection via its electro-proportional flow-controlled unit control. As long as the system pressure in the high-pressure line of the hydrostatic drive is at or just above the pressure limit level and the first hydraulic motor has not yet reached its maximum displacement, the second hydraulic motor will, in a self-regulating manner, contribute more or less to the torque supply of the hydrostatic drive, reflected in a varying response of the deflection of the adjustment element of the second hydraulic motor according to the operating state. The second hydraulic motor will not deflect to larger displacement levels until the first, electro-proportionally adjustable hydraulic motor has reached its maximum displacement while the torque requirement on the hydrostatic drive continues to increase.

In another preferred embodiment of the invention, the second, pressure-proportional hydraulic motor can also be set entirely to a displacement equal to zero. In this case it no longer participates in driving the hydrostatic drive. In this embodiment of the hydrostatic drive according to the invention, the second hydraulic motor can be disengaged from the mechanical connection with the first hydraulic motor on reaching a displacement equal to zero, so that power losses such as splash losses can be avoided, for example due to simultaneous rotation of the second hydraulic motor via the shared transmission. However, the basic prerequisite for this is the secure attainment of a zero displacement so that, after a clutch for disengaging the second hydraulic motor is opened, the second hydraulic motor does not run without load and run the risk of over-rotating. A hydraulic motor running without load, since it is unbraked, very quickly reaches overspeed, as a result of which damage to the hydraulic motor cannot be ruled out. Such a disengagement is preferable if the hydrostatic drive is to reach its maximum rotational speed or maximum speed, for example, at which the second hydraulic motor cannot (or can no longer) simultaneously rotate without damage occurring. In order to reach the maximum speed of a hydrostatic drive, levels of high pressure are generally sufficient which are below the level of the pressure limit.

If the high pressure exceeds the specified/set pressure limit in the high-pressure line in a hydrostatic drive with disengaged second hydraulic motor (again), the second hydraulic motor has to be re-engaged before being deflected so that load-free rotation/over-rotation is avoided.

Generally speaking, therefore, the method according to the invention or the hydrostatic drive according to the invention provides a method and a device in which the (pre-)set power provided for the hydrostatic drive, supplied by the hydraulic pump in a closed hydraulic fluid circuit, is distributed automatically and in a load-dependent manner between one, two or more hydraulic motors, in a way which is adapted to the operating situation. According to the invention, the power set at the hydraulic pump, depending on the torque requirement at the hydrostatic drive, can either be supplied by the flow-controlled electro-proportionally adjustable hydraulic motor on its own to the shared output shaft of the hydrostatic drive or in conjunction with another or with several hydraulic motors adjustable on a pressure-controlled basis. Here an activation pressure—preferably adjustable—of a pressure-proportional control valve decides whether an additional pressure-controlled hydraulic motor is to actively participate in powering the hydrostatic drive.

The activation pressure is equal to a threshold pressure or a pressure limit on the high-pressure side of the hydrostatic drive. In a preferred embodiment of the invention, this pressure limit is equal to the pressure at which the drive motor of the hydrostatic drive would be overloaded to an inadmissible extent by the external load, which in an extreme cases could result in the drive motor stalling or even being damaged. However, the hydraulic motor control according to the invention only intervenes in the hydraulic transmission on the secondary side and, for the purpose of simplification of the description of the invention, assumes a constant supply of power by the drive motor on the primary side. A person skilled in the relevant art is aware, however, that an increase or decrease in torque requirement can be addressed on the primary side, too, by adjusting the hydraulic pump power or drive motor power. However, it is often the case that optimum operation of the primary-side units is to be maintained as far as possible and only the secondary-side output of the hydrostatic drive is to be influenced, which is the object of the present invention.

By fixing a pressure limit for activation of the pressure-proportional control valve, it is ensured that the second (pressure-controlled) hydraulic motor is only deflected and actively involved in powering the hydrostatic drive if a torque requirement on the shared output shaft increases to such an extent that the increasing high pressure would for example decrease the rotational speed of the hydrostatic drive to an inadmissible level. By specifying an activation pressure/pressure limit, however, it is also possible to hydraulically withdraw the pressure-controlled hydraulic motor from powering the hydrostatic drive at a pressure level in the high-pressure line that is below the pressure limit, for example by means of (automatic) destroking to its minimum or zero position.

If the pressure in the high-pressure line exceeds the specified pressure limit, the control valve of the second hydraulic motor opens due to the (increased) pressure force acting on the control valve. For this purpose, according to the invention, the pressure-controlled control valve of the second hydraulic motor is preferably connected to the high-pressure line of the hydrostatic drive by means of a connection line, in such a way that the high pressure in the high-pressure line applies a pressure force to the control valve spool which actuates the control valve. Further preferably, when the control valve is operated, i.e. when the high pressure exceeds a specified pressure limit, the pressure in the servo displacement device of the second hydraulic motor can be regulated in such a way that the displacement of the second hydraulic motor is adapted pressure-proportionally to the pressure in the high-pressure line. Further preferably, this happens on only one side of a servo displacement unit which is capable of being pressurized with hydraulic fluid on two sides. This needs-oriented regulation of the pressure in the servo displacement unit of the second hydraulic motor means that no further regulation or control of the second hydraulic motor is necessary, since the displacement of the second hydraulic motor is adapted automatically to the operating requirements of the hydrostatic drive. However, a person skilled in the art is familiar with such a pressure-proportional or pressure-controlled adjustment facility of a hydraulic motor, for example for hydrostatic single-motor drives, so this does not have to be explained in more detail here.

According to the invention, however, if the high pressure exceeds the specified pressure limit, initially only the pressure-controlled control valve is operated, whereby the displacement of the second hydraulic motor is increased on a pressure-controlled basis. Subsequently, according to the invention, the displacement of the first hydraulic motor is electro-proportionally re-adjusted and increased, preferably by means of a correspondent control signal of an electronic control system to a solenoid of the electro-proportional control valve of the first hydraulic motor. In this way, by means of a secondary regulation of a hydrostatic multiple-motor drive, a pressure increase in the high-pressure line of the closed hydraulic fluid circuit is transferred to the hydraulic pump and the drive motor on the primary side in a reduced manner. The drive motor of the hydrostatic drive can thus preferably be maintained or continue to be maintained at or near its optimum operating point. The secondary-side self-regulation of the hydrostatic drive prevents a significant (potentially inadmissible) rotational speed decrease for the drive motor of the hydrostatic drive due to an increase in high pressure up until the point at which both hydraulic motors have reached their maximum displacement. Only then will a high pressure which is still above the pressure limit level impact on the rotational speed of the drive motor of the hydrostatic drive on the primary side. The inventive flow-controlled and electro-proportional subsequent adaptation of the first hydraulic motor to the increase in displacement of the second pressure-controlled hydraulic motor enables automatic adjustment of the torque of the hydrostatic drive to the current operating situation without intervention in the primary-side power level of the hydrostatic drive. Minimum control effort is used to achieve an optimum torque or rotational speed output at the shared output shaft of the hydrostatic drive.

In a further configuration of the above-described preferred embodiments of the invention, the operation/actuation pressure of the pressure-controlled control valve can be adjustable both statically when the hydrostatic drive is put into operation, for example by means of a setting screw for the tension of the valve spring of the pressure-controlled control valve, and also dynamically during operation. This can be effected, for example, by means of a solenoid actuated by the electronic control system of the hydrostatic drive, whose force acts against the valve spring of the pressure-controlled control valve, for example. The lower the counterforce of the solenoid, the higher the pressure limit on the high-pressure side of the hydrostatic drive can be before the second hydraulic motor participates in supplying torque on a pressure-controlled basis. The actuation pressure in the connection line between the pressure-controlled control valve and the high-pressure line and from the exceedance of which, the control valve spool is moved, can thus be adapted, for example, specifically and dynamically to the conditions of use and operation of the hydrostatic drive. Further preferably, the actuation pressure is also adjustable or can be set during operation of a hydrostatic drive and can be adapted to the operating state or the external conditions of the hydrostatic drive of the work machine. In this way, for example, the specifiable pressure limit can be dynamically adapted depending on the rotational speed at which the control valve spool for pressure regulation is moved in the servo displacement device. According to the invention, such adaptation also includes switching a pressure-controlled control valve to operational readiness in order to prevent, for example, the pressure-controlled hydraulic motor being activated at rotational speeds which are higher than its maximum permitted rotational speed limit.

In hydrostatic drives with a large number of pressure-controlled hydraulic motors, by feeding current to these solenoids, for example arranged at the respective pressure-controlled control valves, the associated hydraulic motors can be activated individually according to use via the allocated pressure-controlled control valve, and they can be deactivated again by cutting off the current feed. A person skilled in the relevant art will recognize here that there are other standard equivalent electronic, hydraulic and/or mechanical possibilities for the activation and deactivation of a pressure-controlled hydraulic motor arranged according to the invention in a hydrostatic drive, these other possibilities therefore also being included in the inventive concept. It will thus not be necessary to go into a detailed description of these possibilities at this point. According to the invention, however, the first, electro-proportionally adjustable hydraulic motor remains permanently in the drivetrain both hydraulically and mechanically and therefore supplies its mechanical power permanently to the shared output shaft during operation of the hydrostatic drive, providing the hydraulic pump is powered by the drive motor and is deflected to a conveying volume greater than zero.

During operation of a hydrostatic drive according to the invention, the conveying volume of the hydraulic pump in another preferred embodiment is always set by an electronic control system such a way that the drive motor powering the hydraulic pump is operated at or just below its optimum operating point, or else on or just below its rated rotational speed. Preferably, the drive motor is operated in a range of approx. 5% to approx. 15% below its rated rotational speed (reduced) so that fluctuations in rotational speed due to load fluctuations, for example when driving over an obstacle such as a tree trunk or similar impact as little as possible on the supply of power to the drive motor. The control of the flow rate of the hydraulic pump is preferably effected according to the invention by the same electronic control system which specifies the electric control signal for the electro-proportional adjustment of the first hydraulic motor. For this purpose, in another preferred embodiment, a rotational speed sensor can be provided at the drive shaft of the hydraulic pump, for example, which together with a deflection angle sensor placed at the hydraulic pump, specifies a control signal for the setting of the conveying volume of the hydraulic pump.

As already mentioned above, the hydrostatic drive according to the invention can be operated in both rotational directions, for which standard high-pressure switching valves are to be provided on the motor side of the hydrostatic drive. These ensure that when the direction of flow of the hydraulic pump is reversed and the high-pressure side and the low-pressure side are exchanged, hydraulic fluid under high pressure is fed to both the electro-proportionally controllable servo displacement unit and the pressure-controlled servo displacement unit, so that the method according to the invention as described above is capable of being executed.

BRIEF DESCRIPTION OF THE DRAWINGS

Based on the following Figures, preferred inventive embodiments of the load-dependent and pressure-controlled displacement regulation of several hydraulic motors are explained in more detail, without limiting the extent of protection of the invention to these embodiments. The inventive displacement regulation of hydraulic motors in response to changes of the external load on the hydraulic motors is explained in detail for the embodiments shown, taking the example of two hydraulic motors. A person skilled in the relevant art will recognize, however, that the regulation according to the invention can be extended to a large number of hydraulic motors arranged in parallel in a closed hydraulic circuit. According to the invention, one of the hydraulic motors is a hydraulic motor which is electro-proportionally controllable in its flow volume and can be adjusted in its displacement by means of an electrical signal of a control unit or an electronic control system. The following are shown.

DETAILED DESCRIPTION

Figure 1:
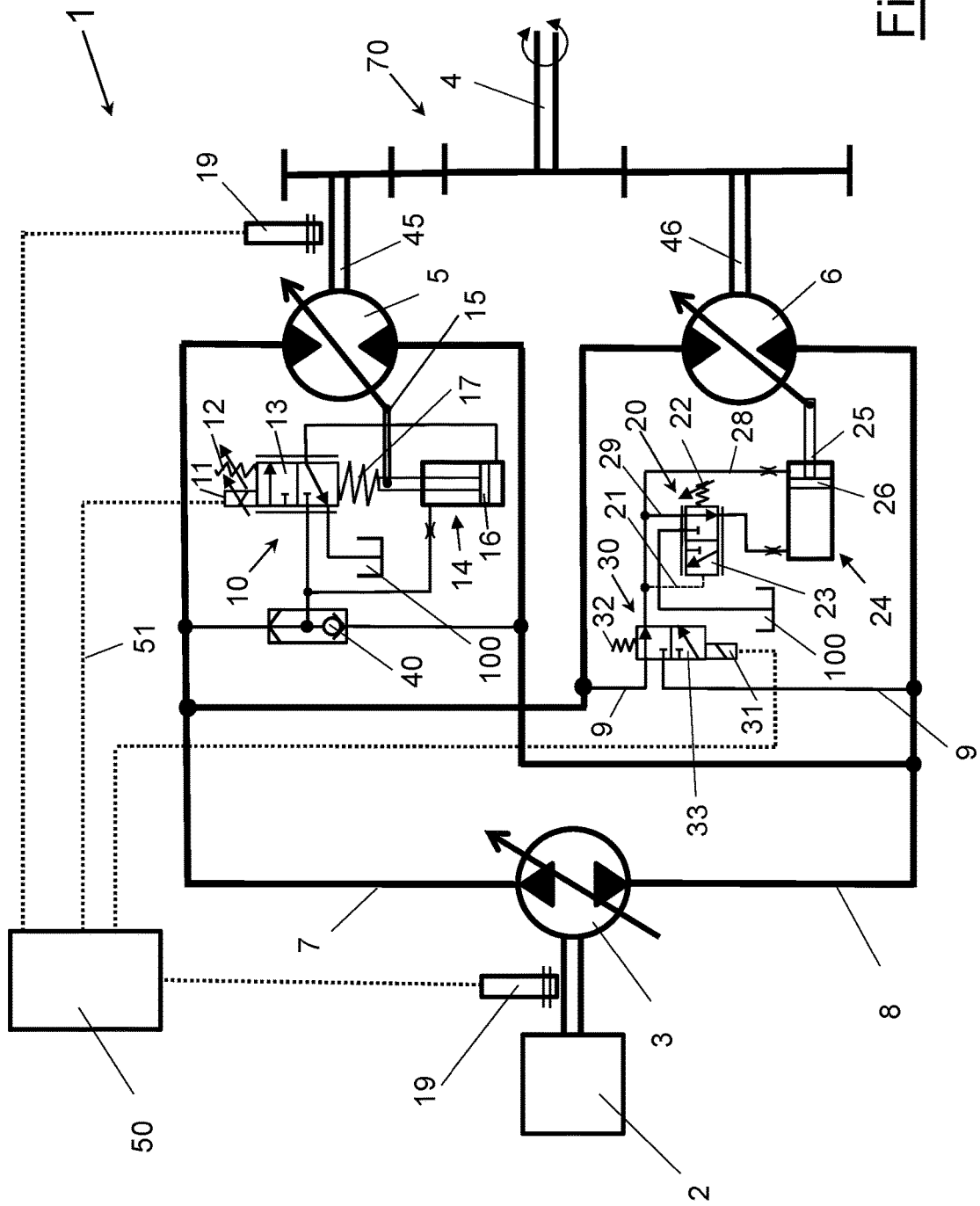
FIG. 1 is a schematic representation of a first embodiment of the invention.

FIG. 1 shows a hydrostatic drivetrain 1 which is powered by a drive motor 2, for example a combustion engine. The drive motor 2 powers a hydraulic pump 3 in a closed hydraulic fluid circuit. Via a hydraulic line 7 which in this embodiment is a high-pressure line 7 by way of an example, a first flow-regulated hydraulic motor 5 which is electro-proportionally adjustable in its displacement is supplied with hydraulic power. Via a low-pressure-conducting hydraulic line 8, pressure-relieved hydraulic fluid is fed back to the hydraulic pump 3 by the first hydraulic motor 5. Parallel to the first hydraulic motor 5, a second hydraulic motor 6 which is adjustable in its displacement on a pressure-controlled basis is integrated in the closed hydraulic circuit in such a way that the two hydraulic motors 5, 6 can be powered by the same hydraulic pump 3 and act with their output shafts 45, 46 on a shared output shaft 4, for example in a traction drive of a work machine (not shown). Both the first hydraulic motor 5 and the second hydraulic motor 6 are supplied with hydraulic fluid under high pressure by the hydraulic pump 3 via a hydraulic line 7 and feed back hydraulic fluid that has been pressure-relieved by them to the hydraulic pump 3 via a hydraulic line 8.

The first hydraulic motor 5 can be adjusted in its displacement and therefore in its torque output and rotational speed by means of an electro-proportional control valve 10. An actuator 11, preferably configured as a solenoid, can shift a control valve spool 13 proportionally to a control signal from an electronic control system 50 in such a way that a servo pressure acting on the larger surface of a servo piston 16, to which pressure can be applied on both sides, is adjustable in its level. The level of the servo pressure determines the displacement of the first hydraulic motor 5. In this way, the displacement of the first hydraulic motor 5 can be set proportionally to the level of the electrical signal on the actuator 11, in other words proportional to its electrical powering. Further preferably, the first hydraulic motor 5 is a hydraulic motor which can be operated in both rotational directions.

The second hydraulic motor 6 shown in FIG. 1 is preferably also capable of being operated in both rotational directions and is, according to the invention, adjustable in its displacement on a pressure-controlled basis. For the purpose of pressure-controlled adjustment of the displacement of the second hydraulic motor 6, a pressure-proportional control valve 20 is arranged upstream of a servo displacement device 24 of the hydraulic motor 6. The servo displacement device 24 can set the displacement of the second hydraulic motor 6 by means of an adjustment element 25. Via a connection line 9 and feed lines 28 and 29, which can be reciprocally connected to the respective high-pressure-conducting working line 7, hydraulic fluid under high pressure can be fed to both sides of a servo piston 26 of the servo displacement unit 24, whereby the feed line 29 directs hydraulic fluid to the larger of the two servo piston sides. Control pressure can be applied on the side of a control valve spool 23 opposite the control valve spring 22, whereby the control pressure dependent on the high pressure and is present and is present in a control pressure line 21 which branches off from the connection line 9. If the control pressure in the control pressure line 21 exceeds a specified value, the pressure force thereby generated can shift the control valve spool 23 against the force of the control valve spring 22. Since the control pressure is dependent on the pressure in the high-pressure line 7 of the hydrostatic drive 1, the pressure limit at which the control valve 20 is to be actuated can be specified by the control valve spring 22. If the spring force of the control valve spring 22, as shown in FIG. 1 by way of an example, is adjustable, the pressure limit for operation of the control valve 20 is adjustable.

The pressure-controlled control valve 20 is positioned in the feed line 29, whereby the control valve 20, in a non-actuated initial position, enables a fluid connection from the connection line 9 via the feed line 29 to the servo displacement unit 24. When the high pressure in the high-pressure line 7 exceeds the specified pressure limit, the control valve 20 closes the feed line 29 for hydraulic fluid under high pressure to the servo displacement unit 24. At the same time, the control valve 20 in this activated, switched position opens a discharge line to a tank 100 and enables hydraulic fluid to flow out of the servo displacement unit 24. As a result, the pressure drops in the servo cylinder on the side facing the larger servo piston side, for example. The high pressure in the feed line 28 acting on the smaller side of the servo piston can then shift the servo piston 26 in the servo displacement unit 24, whereby the displacement of the second hydraulic motor 6 is adjusted in the direction of a higher displacement.

In the initial position of the control valve 20 as shown in FIG. 1, the feed line 29 to the servo displacement unit 24 is fully opened. The pressure in the servo cylinder of the servo displacement unit 24 is therefore at the same level on both sides of the servo piston 26. The servo piston 26 in FIG. 1 is shifted to the right, since the circular ring area on the side of the servo piston 26 on which the adjustment element 25 is located is smaller than the full circular area on the opposite side. The second hydraulic motor 6 is in the position in which it exhibits no or almost no displacement and is rotated idly by the first hydraulic motor via a transmission 70 and its drive shaft 46.

If the pressure in the pressure control line 21 exceeds the predefined value for the pressure limit, the pressure force on the control valve spool 23 is greater than the spring force of the control valve spring 22 and the control valve spool 23 is shifted to the right in the plane of the drawing. As a result, less pressure is applied to the larger side of the servo piston 26 since this can be pressure-relieved to an area with lower pressure such as a tank. This results in a shifting of the servo piston 26 to the left in the plane of the drawing, causing the displacement of the hydraulic motor 6 to be increased via the adjustment element 25.

Furthermore, FIG. 1 shows that in the case of a further drop in pressure below the predefined pressure limit in the high-pressure line 7, the control valve spring 22 shifts the control valve spool 23 back in the direction of its non-actuated initial position and reduces or closes the opening cross-section for the discharge of hydraulic fluid displaced from the servo displacement device to the tank 100 when the pressure in the high-pressure line has dropped below the specified pressure limit. In this way, a pressure balance can be re-established on both servo piston sides of the servo piston 26, whereby the differently sized servo piston areas causing the servo piston 26 to move back in the direction of its initial position and the adjustment element 25 to destroke the hydraulic motor 6 back in the direction of its zero position.

In practice, however, the pressure limit, i.e. the spring force of the control valve spring 22, will be selected in such a way that the control valve spool 23 can be shifted back and forth between the maximum open position for discharge to the tank and the non-actuated initial position, thereby achieving a load-dependent generation of torque in the second hydraulic motor 6. Consequently, in order to power the shared output shaft 4, the second hydraulic motor 3 can be adjusted on a load-dependent and pressure-controlled basis in such a way that in the event of the pressure level in the high-pressure line 7 being exceeded, the second hydraulic motor 6 exhibits an increase in stroke volume and thereby actively participates in powering the hydrostatic drive 1. In doing so, the displacement of the second hydraulic motor 6 is increased for as long as the pressure in the high-pressure line 7 drops below the pressure limit and the control valve 20 reduces or even closes the discharge to the tank 100 (again). In this way, the pressure on the larger side of the servo piston 26 can increase again and the second hydraulic motor 6 is adjusted in the direction of a smaller displacement.

If one assumes an initial operating situation in which only the first hydraulic motor 5 supplies power to the shared output shaft 4 and the second hydraulic motor 6 is in its zero position, this operating state is maintained for as long as the pressure in the high-pressure line 7 does not exceed a specificable threshold pressure/pressure limit. In a motor vehicle drive, such an operating state occurs on a flat surface at a constant speed, for example. If the external load on the hydrostatic drive 1 increases, because for example the fraction drive moves into a hill climb, the pressure in the high-pressure line(s) 7 increases and therefore also in the connection line 9 and in the pressure control line 21 before the control valve 20. When the pressure force from the control pressure line 21 on the control valve spool 21 exceeds the actuation force specified by the control valve spring 22, as explained in detail above, the displacement of the second hydraulic motor 6 is increased so that the latter contributes a higher torque in order to overcome the external load. Proportionally to the increase in its stroke volume, the rotational speed of the hydraulic motor 6 decreases, which is also transferred to the first hydraulic motor 5 by means of the mechanical connection between the two hydraulic motors, for example via a transmission 70, so that the rotational speed of the first hydraulic motor 5 likewise decreases. At the same time as the displacement of the second hydraulic motor 6 increases, the flow volume through the first hydraulic motor 5 decreases, because a constant level of hydraulic power is to be provided on the primary side via the hydraulic pump 3 as far as possible.

By means of a rotational speed sensor 19, an electronic control unit 50 detects the decrease in rotational speed and flow volume of the hydraulic motor 5 and, in response to this, commands the first hydraulic motor 5 by means of a newly calculated control signal, to likewise adopt a larger displacement angle so as to re-establish a specified target flow volume value. The stroke volume of the first hydraulic motor 5 increases. Due to the fact that both displacement levels of the hydraulic motors 5 and 6 increase, the pressure in the high-pressure lines 7 drops, which in turn causes the deflection, i.e. the displacement, of the second hydraulic motor 6 to decrease. The reason for this is that the transfer of pressure fluid from the connection line 9 via the control valve 20 into the feed line 29 is less strongly inhibited, so that the pressure on the second, larger servo piston side in the servo displacement unit 24 can increase again and the second hydraulic motor destrokes. If the pressure in the high-pressure line 7 remains below the pressure limit in spite of the decrease in displacement of the second hydraulic motor 6, however, the destroking can take place until the pressure limit in the high-pressure line is reached once again or the (minimum) zero displacement of the second hydraulic motor 6 has been reached. In practice, therefore, the control valve 20 is actuated and relieved on a load-dependent basis, since the pressure limit is preferably selected in such a way that an increase of the external load on the hydrostatic drive has little impact as possible on the rotational speed of the drive motor 2, via which the hydrostatic drive 1 is supplied with power.

From the above descriptions based on the embodiment shown in FIG. 1, a person skilled in the art recognizes that the hydrostatic drive 1 according to the invention is self-regulating within a power defined by the drive motor 2, without requiring another electrical signal for the second or other hydraulic motors 6. According to the invention, the result is that the displacement levels of two or more hydraulic motors of a hydrostatic drive are adapted automatically to the load conditions. Synchronized by their respective flow volume, the hydraulic motors drive a shared output shaft 4 and supply this with the hydraulic power provided by the hydraulic pump 2 via the drive motor 2 in the proportion of torque and rotational speed as required, without one of the two hydraulic motors or the drive motor being overloaded. Thus in a simple manner it is possible to benefit from the advantages of hydrostatic multiple-motor drives with just one electrical control for the direct electro-proportional power adjustment of a hydraulic motor in a hydrostatic drive. The electric control or the electronic control system does not have to be expanded in this connection. In particular, existing hydrostatic drives can easily be converted, retrofitted or upgraded in this way.

According to the invention, when a particular system pressure is reached at which the first hydraulic motor 5 is not sufficient to provide a mechanical power, the second hydraulic motor 6 is automatically activated on a pressure-controlled basis and integrated in the drivetrain. According to the invention, the first hydraulic motor 5 is adapted in its displacement by the electronic control system 50 without the machine operator having to intervene in regulation. This is possible for both rotational directions of the shared output shaft 4 and can preferably be effected by reversing the flow direction of the hydraulic pump 3, whereby the high-pressure side is exchanged with the low-pressure side, whereby automatically activated or switchable switching valves are provided for the change of direction, both for the first hydraulic motor 5 and the hydraulic motor 6, ensuring that the two servo displacement units 14 and 24 of the hydraulic motors are supplied with hydraulic fluid under high pressure. In FIG. 1 an exemplary double-check valve 40 is shown for the first hydraulic motor which automatically opens to the respective high-pressure side. For the second hydraulic motor 6, an exemplary switching valve 30 is provided which can be electrically activated via a switching valve actuator 31, for example likewise controlled via the electronic control system 50.

Figure 2:
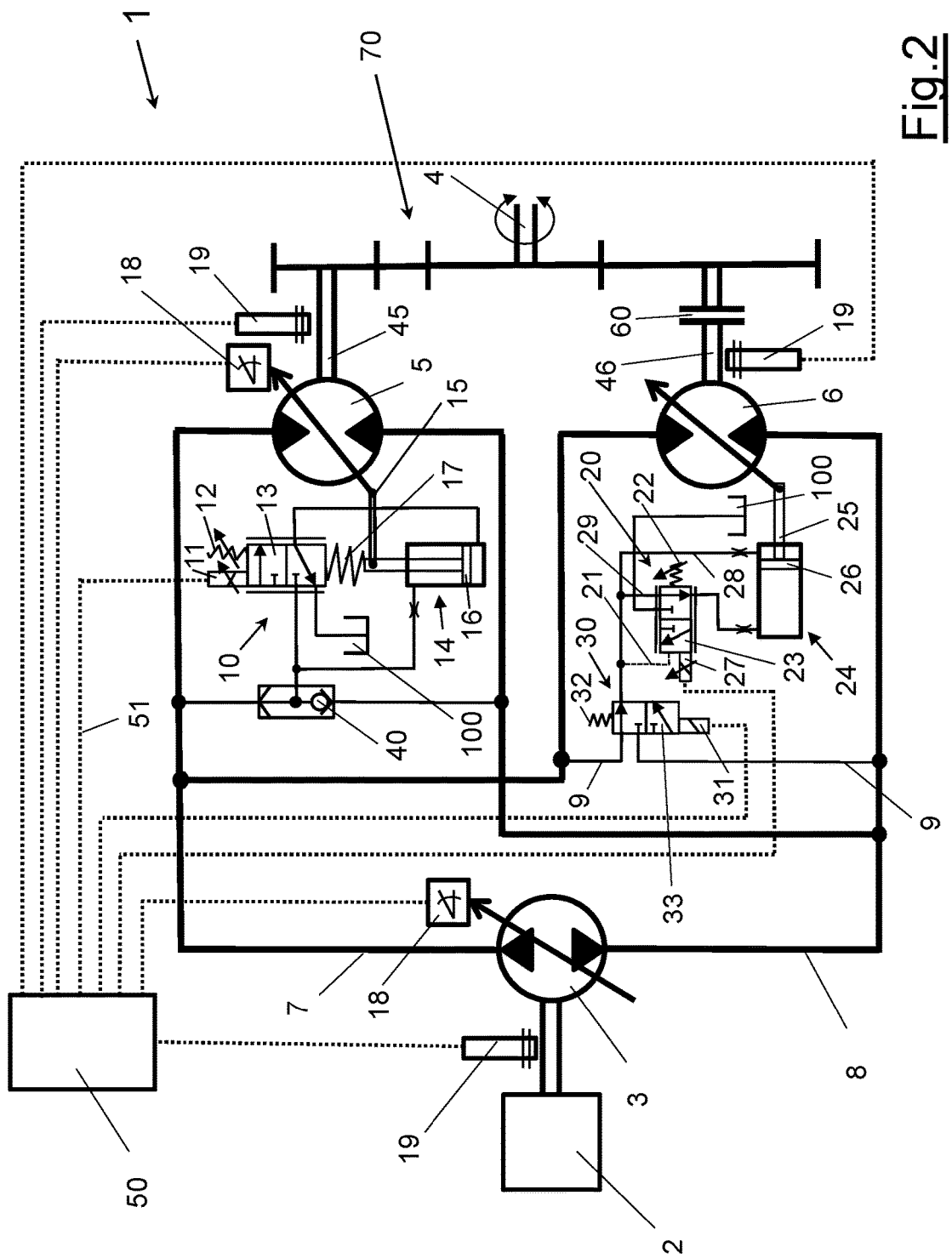
FIG. 2 is a schematic representation of a second embodiment of the invention.

In FIG. 2 a further embodiment of the inventive control of two hydraulic motors is shown which are arranged in parallel in a closed hydraulic fluid circuit. Here, the same reference numerals have been used for elements which correspond to the elements of the embodiment shown in FIG. 1. The embodiment shown in FIG. 2 is distinguished from the embodiment in FIG. 1 in that in the pressure-controlled control valve 20 there is an additional, for example electrical actuator 27 provided on the pressurized side of the control valve spool 23. This electrical actuator 27 supports the pressure force of the control pressure line 21 acting onto the control valve spool 23 against the force of the control valve spring 22.

The control valve 20 in the embodiment according to FIG. 2 is configured in such a way that the pressure force acting on the control valve spool 23 is not sufficient on its own to move the latter. The level of electrical current feed to the actuator 27, i.e. the level of force which supports the pressure force on the control valve spool 23, can be used to specify the level of the pressure limit in the high-pressure line 7. When this pressure limit is reached, the second hydraulic motor 6 is to actively participate in powering the hydrostatic drive 1. In other words, when the actuator 27 is activated, the control valve 20 can be switched to operational readiness and vice versa. In this way, for example, a rotational speed limit can be specified which, when exceeded, leads to the second hydraulic motor 6 being protected in that the control valve 20 is switched to inactive by deactivating its electrical current feed. If the force of the actuator 27 is adjustable or controllable, this can also be effected dynamically, depending on the operating situation of the hydrostatic drive 1. Here, a person skilled in the art recognizes that the actuator 27 is preferably controlled by the electronic control system 50 or can have a control current applied to it. However, a person skilled in the art also recognizes that the actuator 27 can equally be capable of being controlled or activated mechanically, pneumatically, hydraulically or otherwise electrically.

What is more, the embodiment according to FIG. 2 is distinguished from that of FIG. 1 by a clutch 60 positioned in the output shaft 46 of the second hydraulic motor. The purpose of the clutch 60 is to be able to decouple the second hydraulic motor 6 from the drive of the hydrostatic drive 1 mechanically, too, if it is not participating hydraulically in the drive. When the hydraulic motor 6 is in its initial position, i.e. no hydraulic fluid volume is flowing through the hydraulic motor 6, the hydraulic motor 6 does not generate any torque and rotates idly along with the other hydraulic motor via a transmission 70 which connects the two output shafts 45 and 46 of the two hydraulic motors 5 and 6. This passive rotation generates frictional and splash losses, also increasing the inertia of the hydrostatic drive 1, in particular in the case of changes in rotational speed. These negative influences can be avoided if it is also possible to remove the second hydraulic motor 6 from the drive mechanically. The requirement for this, however, is that its stroke volume is zero since otherwise it will be powered load-free and virtually without resistance by the high pressure, which can result in uncontrolled overspeeding of the hydraulic motor. Such a clutch 60, for example a multi-plate clutch, can also be provided for the embodiment in FIG. 1, however in this case a safety precaution is recommended which prevents the control valve 20 from being activated when the clutch 60 is opened. In the embodiment of FIG. 2 this can be effected, as described above, by disconnecting the actuator 27 from the electric power, which ensures that the servo adjustment 24 puts the second hydraulic motor 6 in its zero position in conjunction with the control valve 20 and in particular the control valve spring 20.

What is more, displacement angle sensors 18 are provided by way of an example in the embodiment in FIG. 2 on the first, electro-proportionally adjustable hydraulic motor 5, though these are not absolutely necessary for the execution of the method according to the invention. With these displacement angle sensors 18, the set method parameters on the respective hydraulic machines can be checked and if necessary corrections can be made to the setting of the displacement angles of the hydraulic machines. In the case of the second, pressure-controlled hydraulic motor 6, such a displacement angle sensor 18 is not necessary for its control since this is set or adjusted in its displacement as required on a load-sensitive basis after a pressure limit is exceeded in the high-pressure line 7. However, a rotational speed sensor 19 can be provided to control its rotational speed, for example, on its output shaft 46.

All in all, the inventive control of two or more hydraulic motors arranged parallel to each other in a closed hydraulic circuit provides a simple, reliable and robust regulation loop which automatically adjusts the torque and rotational speed of the hydraulic motors available on a load-dependent basis with a minimum number of electrical control signals, whereby a pressure limit which can be specified on the high-pressure side determines whether one or more hydraulic motors actively participate in powering a hydrostatic drive and what their share of the required torque is. The automatic (automotive) control device according to the invention for two or more hydraulic motors is also robust because it makes do with a minimum number of electronic components. What is more, the invention is simple to apply to existing hydrostatic drives since an existing electronic control system can be used without having to be expanded. In this way, an added pressure-controlled hydraulic motor can be integrated in an existing drive without complex measures. According to the invention, therefore, a hydrostatic multiple-motor drive can be regulated and controlled with just one electro-proportional control valve according to needs, whereby at least a second hydraulic motor can be activated on a pressure-controlled and load-dependent basis, and this causes the electro-proportional hydraulic motor to be readjusted on a flow-controlled basis. Here the electrically proportionally adjustable hydraulic motor is automatically adjusted in its displacement by the electronic control system without an expansion of the electronic flow control system being required for the first hydraulic motor.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A method for a load-dependent regulation of a hydrostatic drive with a closed hydraulic fluid circuit comprising a first hydraulic motor and, parallel to this, a second hydraulic motor, whereby both hydraulic motors are capable of being powered by a hydraulic pump via a high-pressure line and a low-pressure line and are mechanically coupled to each other via a transmission, whereby:
the displacement of the first hydraulic motor can be adjusted proportionally to an electrical signal of an electronic control system via an electro-proportional control valve,
the displacement of the second hydraulic motor can be adjusted via a pressure-proportional control valve which is hydraulically connected to the high-pressure line via a control pressure line and which can be activated by means of a control pressure dependent on the high pressure;
whereby the method comprises the following steps:
automatic high-pressure-dependent opening of the pressure-proportional control valve, proportional to an exceedance of a predefinable pressure limit in the high-pressure line, whereby the predefinable pressure limit is equal to an opening pressure of the pressure-proportional control valve, adjustment of the displacement of the second hydraulic motor by a second servo control unit which can be controlled via the pressure-proportional control valve, determination of an actual volume flow passing through the first hydraulic motor by means of the electronic control system, comparison of the actual value for the volume flow with a target value for the volume flow by means of the electronic control system, calculation of an adapted control signal by the electronic control system based on a deviation between the actual and target value for the volume flow, transmission of the adapted control signal to the electro-proportional regulation valve, and electro-proportional adaptation of the displacement of the first hydraulic motor by means of a first servo control unit which can be controlled via the electro-proportional control valve.

2. The method according to claim 1 in which the opening pressure of the pressure-proportional control valve is adjustable.

3. The method according to claim 2 in which the opening pressure of the pressure-proportional control valve is changed dependent on the rotational speed of the drive motor.

4. The method according to claim 2 in which the pressure-proportional control valve is switched to operational readiness dependent on the rotational speed of the first hydraulic motor.

5. The method according to claim 1 in which the opening pressure of the pressure-proportional control valve is changed dependent on the rotational speed of the drive motor.

6. The method according to claim 1 in which the pressure-proportional control valve can be switched to operational readiness dependent on the rotational speed of the first hydraulic motor.

7. The method according to claim 1 in which the second hydraulic motor can be mechanically disengaged from the first hydraulic motor when the displacement through the second hydraulic motor is equal to zero.

8. The method according to claim 1 in which a displacement angle and a rotational speed of the first hydraulic motor or that of the shared output shaft is monitored and used to calculate the adapted control signal for the electro-proportional regulation valve.

9. The method according to claim 1 in which a conveying volume flow of the hydraulic pump is set in such a way that a drive motor powering the hydraulic pump is operated at a rotational speed which correspond to its optimum operating point.

10. The method according to claim 9 in which the drive motor is a combustion engine which is operated below its rated rotational speed.

11. The method according to claim 10 in which the combustion engine is operated within a rotational speed range 5% to 15% below the rated rotational speed.

12. A hydrostatic drive with a closed hydraulic fluid circuit comprising a first hydraulic motor and, parallel to this, a second hydraulic motor, whereby both hydraulic motors are capable of being powered by a hydraulic pump via a high-pressure line and a low-pressure line and are mechanically coupled to each other, and whereby:

the displacement of the first hydraulic motor can be adjusted proportionally to an electrical signal of an electronic control system via an electro-proportional control valve via a first servo control unit, the displacement of the second hydraulic motor can be adjusted via a pressure-proportional control valve via a second servo control unit, and the pressure-proportional control valve is hydraulically connected to the high-pressure line via a control pressure line and can be activated by means of a control pressure dependent on the high pressure, in such a way that the pressure-proportional control valve can be automatically activated proportionally to a high-pressure-dependent exceedance of a predefined pressure limit in the high-pressure line, whereby the predefined pressure limit is equal to an opening pressure of the pressure-proportional control valve in the control pressure line, and the displacement of the first hydraulic motor can be adapted by means of a control signal corresponding to a change in volume flow triggered by the change in displacement of the second hydraulic motor, calculated by the electronic control system and transmitted to the electro-proportional control valve.

13. The hydrostatic drive according to claim 12 in which the opening pressure of the pressure-proportional control valve is adjustable.

14. The hydrostatic drive according to claim 13 in which the opening pressure of the pressure-proportional control valve is adjustable dependent on rotational speed.

15. The hydrostatic drive according to claim 12 in which the pressure-proportional control valve can be switched to operational readiness dependent on rotational speed.

16. The hydrostatic drive according claim 12 in which the displacement of the first hydraulic motor can be adjusted by means of an actuator controlled electrically by the electronic control system.

17. The hydrostatic drive according claim 16 wherein the actuator is a solenoid.

18. The hydrostatic drive according to claim 12 in which the first hydraulic motor and/or the second hydraulic motor are adjustable axial motors that are reversible in their rotational direction.

19. The hydrostatic drive according to claim 18 in which the first hydraulic motor and/or the second hydraulic motor are swash plate or bent axis type.

20. The hydrostatic drive according to claim 12 in which adjacent to an output shaft of the first hydraulic motor a rotational speed sensor is placed which is connected to the electronic control system.

21. The hydrostatic drive according claim 12 in which adjacent to an output shaft of the second hydraulic motor a rotational speed sensor is placed which is connected to the electronic control system.

22. The hydrostatic drive according to claim 12 in which adjacent to a drive shaft of the hydraulic pump a rotational speed sensor is placed which is connected to the electronic control system.

23. The hydrostatic drive according to claim 12 further comprising the hydraulic pump, and in which on the first hydraulic motor or/and at the hydraulic pump a displacement angle sensor is placed which is connected to the electronic control system.

24. The hydrostatic drive according to claim 12 in which the hydrostatic drive comprises a clutch with which the second hydraulic motor can be mechanically engaged or disengaged from a shared output shaft of the hydrostatic drive.

* * * * *